United States Patent [19]

Guilino et al.

[11] Patent Number: 4,856,889
[45] Date of Patent: Aug. 15, 1989

[54] UNIFORM STRENGTH OPHTHALMIC LENS HAVING A GRADIENT REFRACTIVE INDEX CHANGING ROTATION-SYMMETRICALLY ABOUT THE OPTICAL AXIS AND METHOD OF MAKING IT

[75] Inventors: Günther Guilino; Herbert Pfeiffer, both of Munich, Fed. Rep. of Germany

[73] Assignee: Optische Werke G. Rodenstock, Munich, Fed. Rep. of Germany

[21] Appl. No.: 51,700

[22] Filed: May 20, 1987

[30] Foreign Application Priority Data

May 20, 1986 [DE] Fed. Rep. of Germany ....... 3616888

[51] Int. Cl.$^4$ .......................... G02C 7/02; GC02 13/18
[52] U.S. Cl. ..................................... 351/159; 350/413; 350/432; 351/176; 351/177
[58] Field of Search ....................... 351/159, 176, 177; 350/413, 432

[56] References Cited

U.S. PATENT DOCUMENTS 3,486,808  12/1969  Hamblen .............................. 350/413
3,718,383  2/1973  Moore .................................. 350/413

FOREIGN PATENT DOCUMENTS 2707601  10/1977  Fed. Rep. of Germany .

OTHER PUBLICATIONS

Charman, W. N.; "Gradient Index Optics"; *The Ophthalmic Optician;* Jan. 31, 1981; pp. 72–84.

*Primary Examiner*—Bruce Y. Arnold
*Assistant Examiner*—Scott J. Sugarman
*Attorney, Agent, or Firm*—Antonelli, Terry & Wands

[57] ABSTRACT

A uniform strength ophthalmic lens having a gradient refractive index changing rotational-symmetrically about the optical axis in which the curvature course of at least one of the two surfaces of the ophthalmic lens is selected without consideration of correction of aberration so that the critical thickness of the ophthalmic lens does not exceed a specific value and that the gradient refractive index is change rotational-symmetrically about the optical axis so as to correct the aberration. In this manner, a significant reduction of the critical thickness of the opthalmic lens, i.e., the center thickness is a positive lens and peripheral thickness in a negative lens, is achieved while providing an ophthalmic lens having good image-forming properties.

17 Claims, 11 Drawing Sheets

----- ΔR
——— ΔS

UNIFORM STRENGTH OPHTHALMIC LENS HAVING A GRADIENT REFRACTIVE INDEX CHANGING ROTATION-SYMMETRICALLY ABOUT THE OPTICAL AXIS AND METHOD OF MAKING IT

BACKGROUND OF THE INVENTION

The present invention relates to a uniform strength ophthalmic lens having a gradient refractive index changing rotational-symmetrically about the optical axis.

Ophthalmic lenses having a gradient refractive index have been discussed numerous times in scientific papers. By way of illustration, we refer to the survey "GRADIENT INDEX OPTICS" by W. N. Charman (The Ophthalmic Optician, 1981, pp. 72–84) and the bibliography listed therein.

As can be learned from said article (p.80, left column), ophthalmic lenses with a gradient refraction index have hitherto been considered a substitute for ophthalmic lenses with aspheric surfaces with "comparably good" optical properties (p. 80, left column following).

A uniform strength ophthalmic lens is also known from DE-OS No. 27 07 601. From said publication it can be learned that a "careful selection of the aspheric base curve and of the refractive index gradients" can reduce aberrations more than it would be possible by means of only an aspheric base curve. To accomplish this, the refractive index is changed radially, in particular, in steps. A continuous changing of the refraction index is only mentioned in passing without presenting a definite technical method.

The problem of reducing critical thicknesses of lenses, i.e. the center thickness in plus a positive lenses and peripheral thickness in minus or negative lenses, is not discussed in the aforementioned article by W. N. Charman nor in DE-OS No. 27 07 601.

SUMMARY OF THE INVENTION

The object of the present invention is to provide uniform strength ophthalmic lenses in which the critical thickness of the lenses is significantly reduced compared to the state of the art while at least possessing the same image-forming properties.

As an inventive step, it was recognized that the reduction of the critical thickness—by choosing a "flat", cosmetically "favorable" base curve, in this connection we refer to U.S. Pat. No. 3,960,442—presenting an "opposite" postulation to minimize aberrations. This particularly applies to negative ophthalmic lenses, which are not discussed in the just cited publication—probably for this reason. Therefore, it is not possible—as was also perceived as a step of the present invention—to reduce the critical thickness and at the same time substantially decrease the aberrations by just employing an aspheric surface.

Surprisingly, however, a successful solution to the object of the present invention is accomplished by proceeding from a uniform strength ophthalmic lens. In this connection it is particularly surprising that in order to reduce the critical thickness of ophthalmic lenses it is possible to improve the diffraction or the course of the curvature of at least one of the two surfaces, without reflecting the correction of the aberrations, in such a manner that the critical thickness of the ophthalmic lens, thus the center thickness in plus lenses or the peripheral thickness in minus lenses does not exceed a specific value. With a homogeneous refractive index, such a selection of the aspheric surface, particularly in the case of minus lenses, would yield unacceptable image-forming properties. Nonetheless, even with such a selection of the aspheric surface aimed solely at minimizing the critical thickness a correction of the aberrations is achieved merely by changing the refractive index—as was recognized as an element of the invention.

In contrast to the method of DE-OS No. 27 07 610, it is thus not necessary to choose either the aspheric course of curvature or the variation of the refractive index in such a manner that the aberrations are minimized, but rather it is possible to pursue different objects—minimizing the critical thickness or correcting aberrations—with the selection of the spherical base curve or the curvature course of aspheric curves and the variation of the refractive index. However, it is not intended to preclude additionally selecting the curvature course of the rotational-symmetrical aspheric surface or surfaces in such a manner that the aberrations are further reduced.

In comparison to the surfaces cited in U.S. Pat. No. 3,960,442 a significantly greater reduction of the critical thickness (center thickness in plus lenses) or in the case of the same center thickness a substantially better correction of the aberrations can be achieved by means of the embodiments of the present invention.

Particularly surprising is, however, that it is possible to substantially dispose freely of the basic ophthalmic aberrations, the refraction error $\Delta R$ and astigmatism $\Delta S$, with a specified thickness by means of improving uniform strength ophthalmic lenses by the method of the present invention:

By way of illustration, one of the fundamental aberrations $\Delta R$ or $\Delta S$ can be reduced to zero over a wide visual angle (plus lenses) or for all visual angles (minus lenses). Furthermore, said two aberrations can also be brought to a desired ratio, by way of illustration, $\Delta R : \Delta S = 1:2$. By using am especially optimized aspheric curvature course for one or both surfaces it is even possible to reduce both aberrations at least over a large visual angle zone substantially to zero.

Changing the refraction index in an ophthalmic lens according to the present invention can, by way of illustration, be a accomplished by the possible means described in FIG. 3 of the aforementioned article "GRADIENT INDEX OPTICS".

Preferred are, however, improvement of the gradient refractive index changing rotational-symmetrically about the optical axis by at least one of changing the refractive index as a function of the distance from the optical axis and vertically to at least one of the two surfaces or a combination thereof.

In any case, a distinct reduction of the critical thickness is attained while continuing to have excellent image-forming properties. Herein the uniform strength ophthalmic lens may or may not be provided with a prism.

Surprisingly, even with plus lenses having spherical surfaces, it is possible not only to substantially reduce the center thickness compared to presently customary lenses by means of the appropriate choice of the two curvature radii, but also to return the image-forming properties, which would then be much worse with a homogenous refractive index, again to at least to the quality of prior art plus lenses by means of the appropriate choice of gradient refractive index changing rotational-symmetrically about the optical axis.

By making at least one of the two surfaces an aspheric surface can further reduce the center thickness in plus lenses and the correction of the aberrations can be further improved. Herein it is particularly advantageous in positive ophthalmic lenses that the aspheric surface is the front surface.

In minus lenses, developing one surface into a rotational-symmetrical asphere and the appropriate choice of refractive index attains such a great reduction of the peripheral thickness, which would lead to unacceptable image-forming properties in a minus lens having an aspheric surface and a homogeneous refraction index.

In minums lenses, it is advantageous that the aspheric surface is the rear surface.

Of course, it is possible to choose comparably complicated rotational-symmetrical surfaces for an aspheric surface, as can be represented, by way of illustration, by power-series expansions of a higher degree on which, if necessary, a conic section function is superimposed. Furthermore, the rotational-symmetrical aspheric surface can also be constructed by means of "spline functions" and additionally optimized to minimize the center thickness also with regard to correcting aberrations.

The concept of the present invention, however, permits considerably reducing the critical thickness with just comparably, simple aspheric curves.

BRIEF DESCRIPTION OF THE DRAWINGS

The present invention is made more apparent in the follow-ing in connection with embodiments of the invention with reference to the drawings.

DESCRIPTION OF THE PREFERRED EMBODIMENTS

In all the figures presented in the following, FIGS. 1-11(a) depicts a (full-scale) cross-section through an ophthalmic lens having a front surface 1 and a rear surface 2. Furthermore, illustrated is the critical thickness, whose magnitude is to be reduced by means of the measures of the present invention. The critical thickness is the center thickness d in plus lenses and the peripheral thickness dr in minus lenses.

Moreover, in FIGS. 1-11(a), the refractive index n is plotted as a function of the distance r from the optical axis, given in millimeters. Express reference is made to the illustrated presentation of the refractive index function with regard to the disclosure.

In FIG. 1-11(b) is plotted the course of the astigmatism $\Delta S$ (unbroken line) and of the refraction error $\Delta R$ (broken line), i.e. the deviation of the effect of the ophthalmic lens from the so-called prescription value as a function of the visual angle. Astigmatism and refraction errors are given in diopters (dpt).

The table below shows the overall effect D (in dpt), the effect $D_1$ of the front surface 1 and the effect $D_2$ of the rear surface 2 (also in dpt) as well as the center thickness d and the peripheral thickness dr for a diameter of 66 mm for all the ophthalmic lenses illustrated in FIGS. 1 to 11.

FIGS. 1 to 6 depict positive ophthalmic lenses, having 8.00 dpt.

Figure 1A:
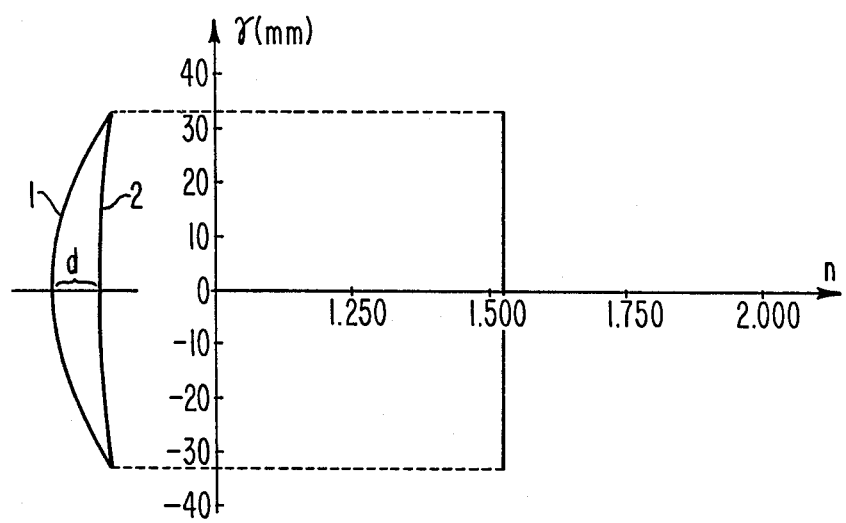
FIGS. 1A to 7B show the course of the refractive index functions and of the aberrations for positive uniform strength ophthalmic lenses, having spheric or aspheric surfaces and different center thicknesses.
Figure 1B:
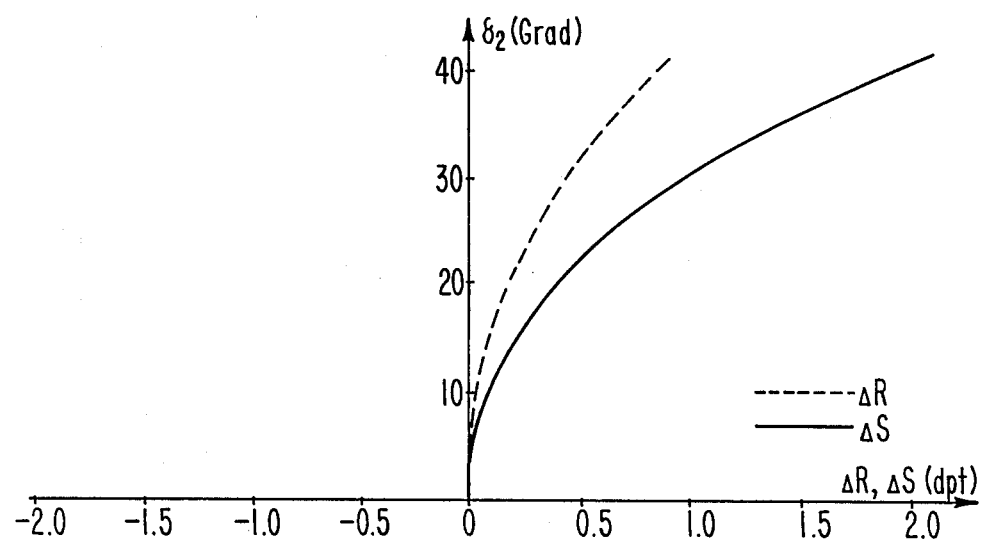

FIG. 1 shows a uniform strength ophthalmic lens, having spheric surfaces and a homogeneous refractive index $n_o = 1.525$. The detection of front surface 1 and of the rear surface 2 are selected in such a manner that there are small aberrations. As can be seen from the table the center thickness d of 8.79 mm is relatively large.

Figure 2A:
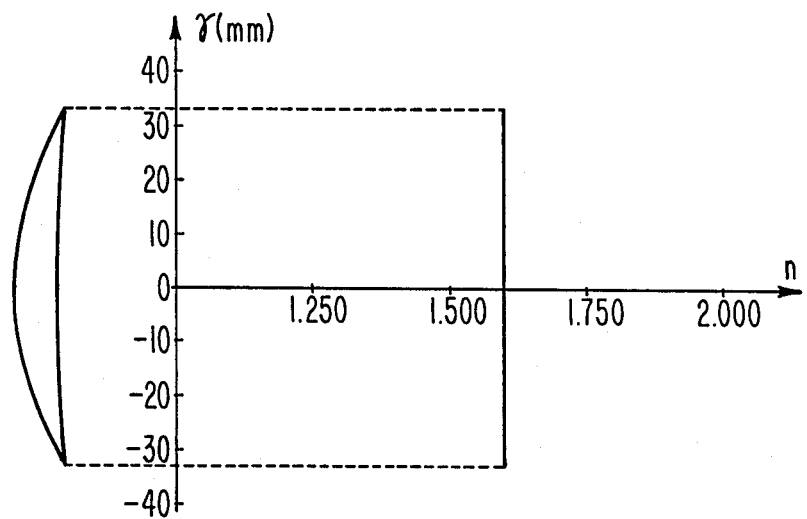
Figure 2B:
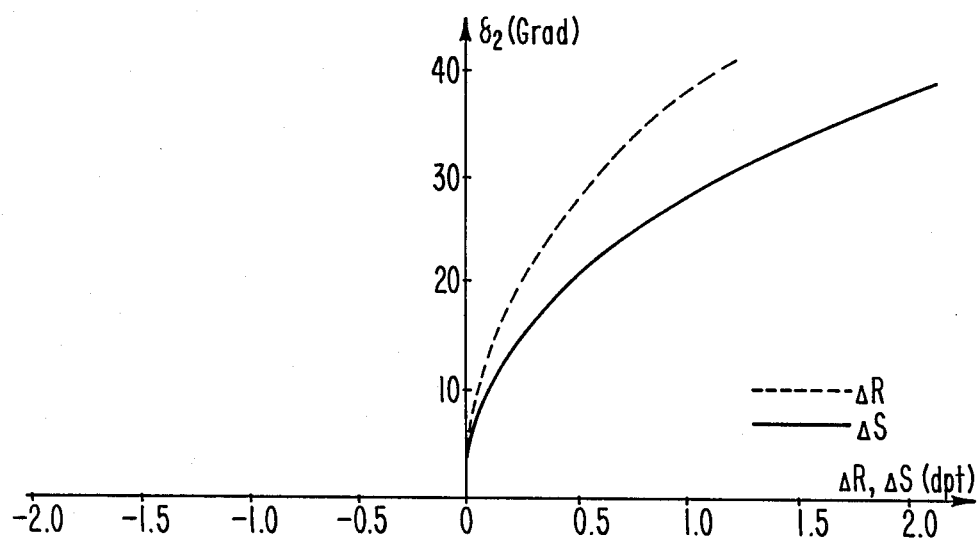

FIG. 2 shows a lens similar to the one in FIG. 1, however, with a refractive index of $n_o$ is 1.6. The diffractions of the both surfaces are chosen in such a manner that the aberrations are small. The center thickness d is only minimally reduced to 7.54 due to the rise in refractive index.

Figure 3A:
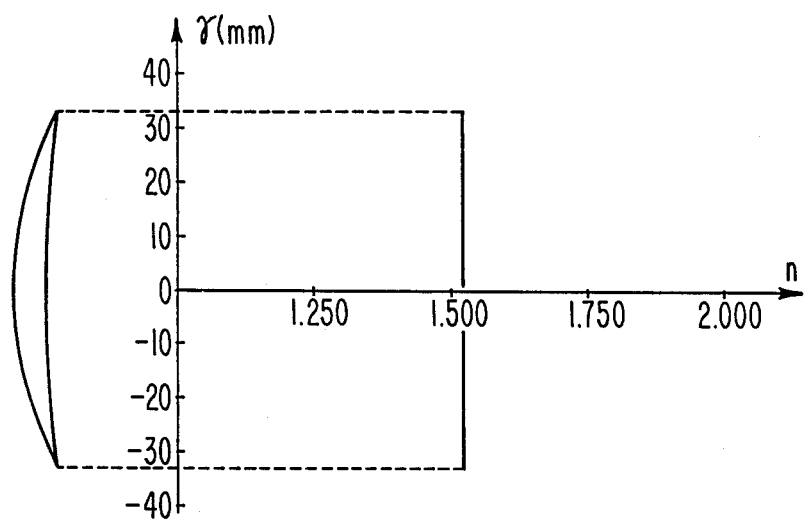
Figure 3B:
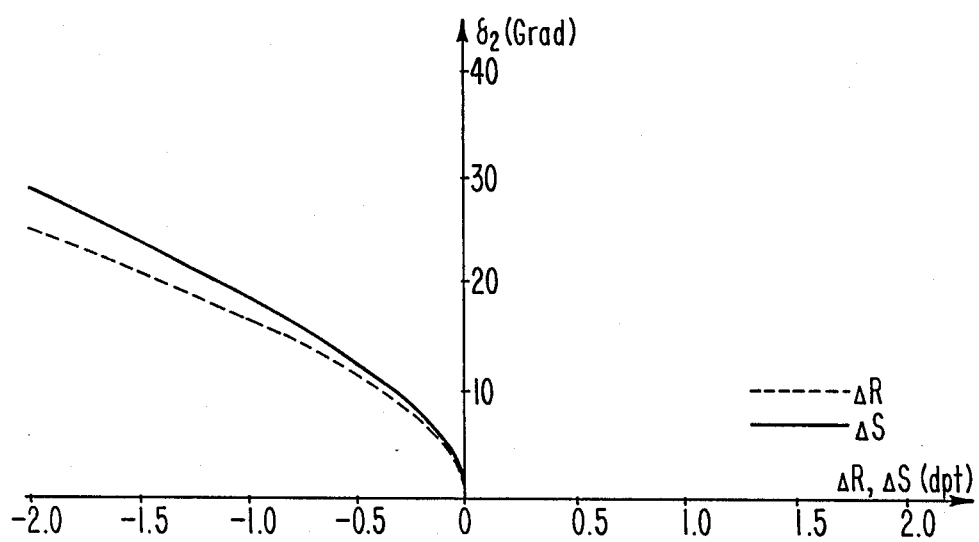
Figure 4A:
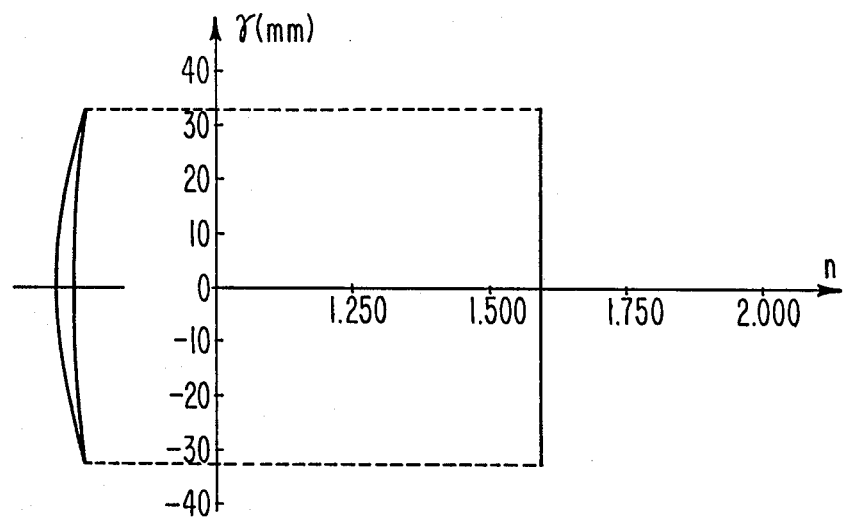
Figure 4B:
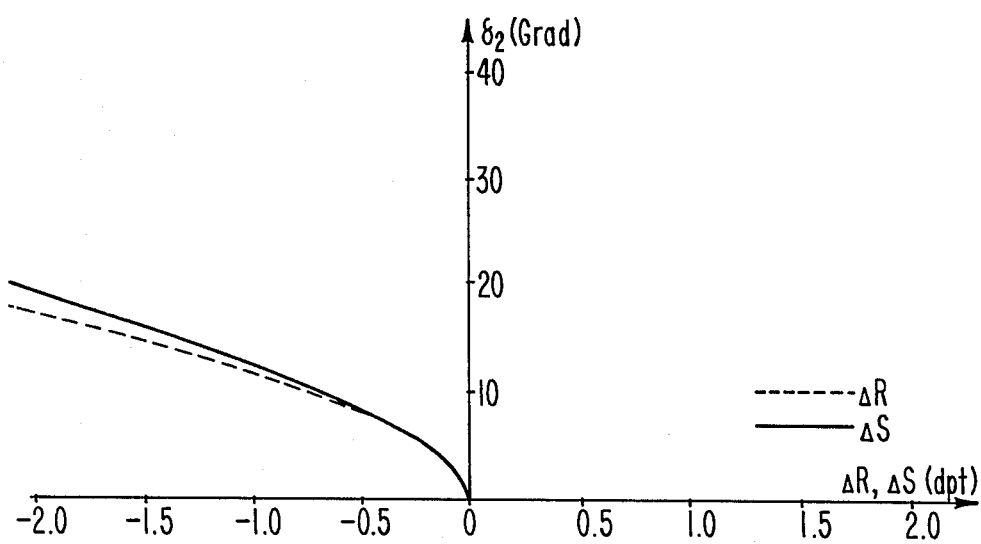

FIGS. 3 and 4 show a uniform strength ophthalmic lens with an aspheric front surface 1 and a homogeneous refractive index of $n = 1.525$ or 1.6. The aspheric front surface is a flat hyperboloid of rotation, met by the following equation:

$$z = Cr^2/(1 + (1-(K-1)c^2r^2)^{-\frac{1}{2}}$$

with z: height of the arrow
r: distance from the axis of rotation
$C = 1/R$; R = curvature radius of the surface in the vertex
K: conic section coefficient.

C is:
$$C = 1/R = D_1/(n-1).$$

Selecting the conic section coefficient K (s, table) of the aspheric surface in such a manner that the center thickness d of the ophthalmic lens is just approx. 60% or 50% of the spheric lenses, having a homogeneous refractive index, illustrated in FIG. 1 or FIG. 2, results in—as a comparison of FIG. 3 or 4 and FIG. 1 or 2 shows—non-acceptable aberrations $\Delta R$ and $\Delta S$, which already amount to more than 1 dpt in a visual angle of 20°.

The following will show that surprisingly great improvements in image quality can be attained by means of a gradient refraction index n(r) as a function of distance r from the optical axis (axis of rotation) even when diffractions or curvature courses of the individual surfaces are chosen resulting in small center thicknesses.

Figure 5A:
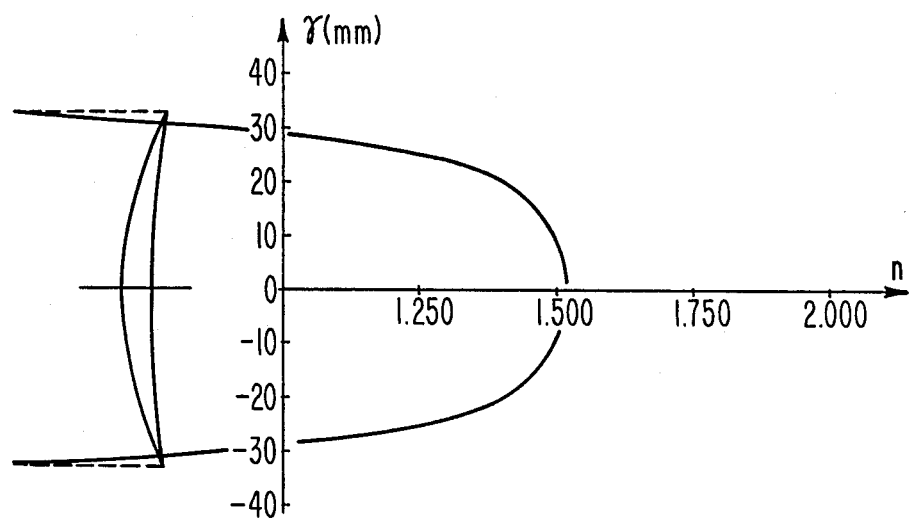
Figure 5B:
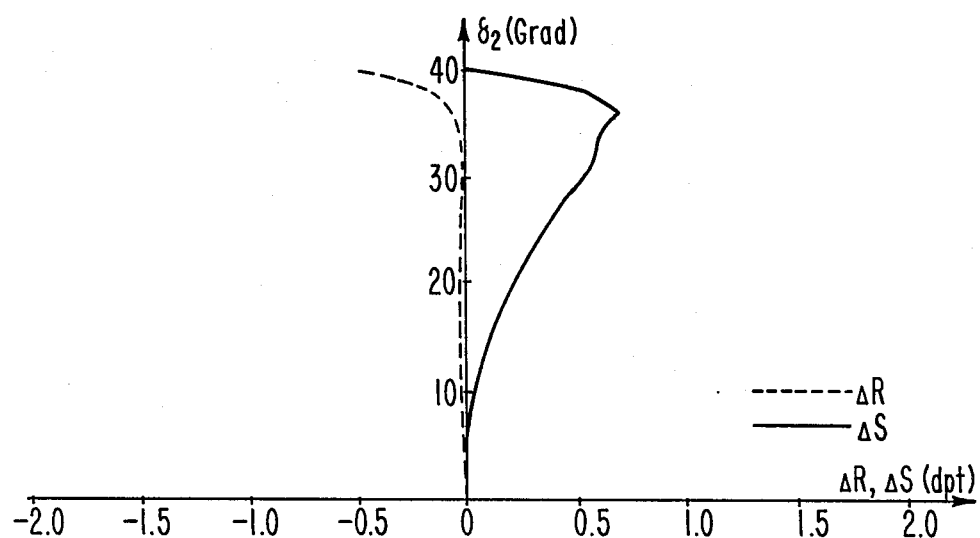

FIG. 5 shows a uniform strength opthalmic lens according to the invention, having two spheric surfaces, whose diffraction is selected in such a manner that a center thickness is yielded amounting to only approx. 66% of the center thickness of the lens illustrated in FIG. 1. Such a selection of the diffractions would result in unacceptable aberrations $\Delta R$ and $\Delta S$ with a homogeneous refractive index, which would already mount to several diopters in small visual angles.

The gradient refraction index n as a function of the distance r from the axis of rotation can, however, substantially reduce aberrations $\Delta R$ and $\Delta S$.

Figure 6A:
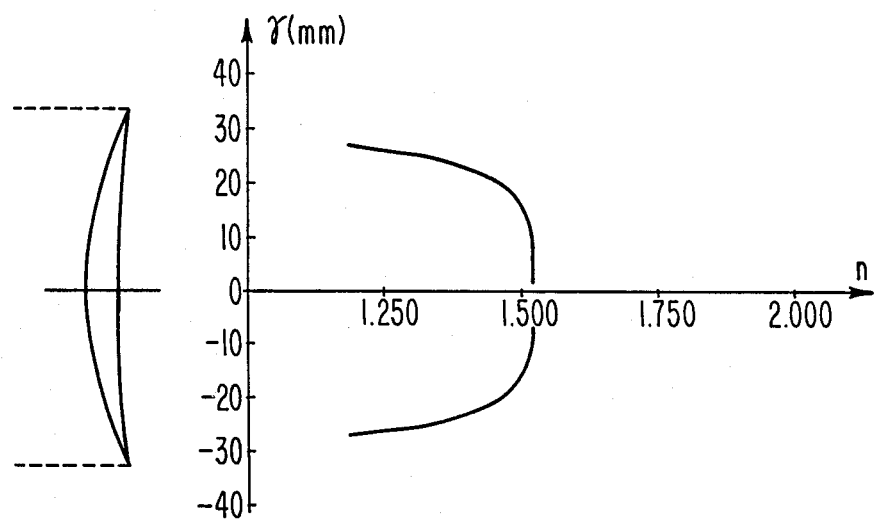
Figure 6B:
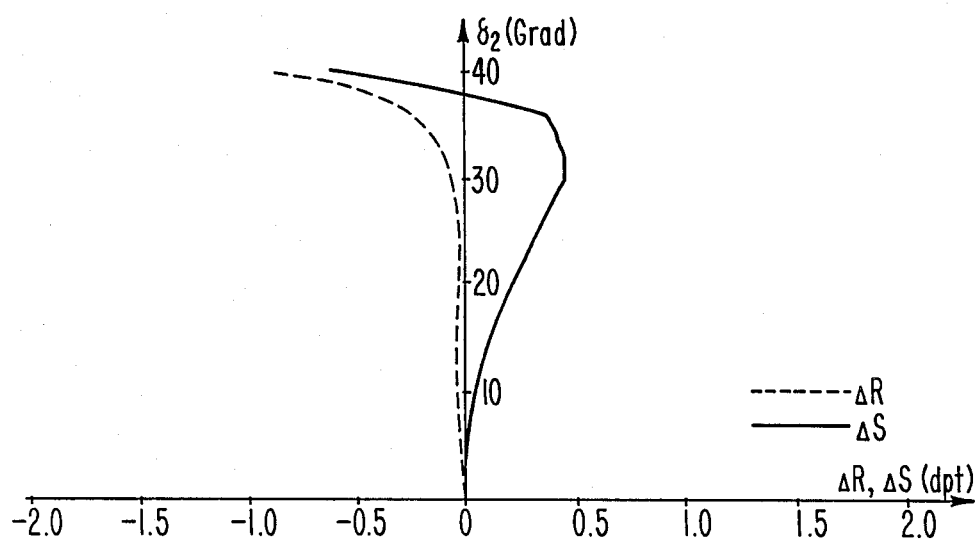

FIGS. 6 and 7 also show uniform strength opthalmic lenses according to the invention, whose refractive index is not constant (homogeneous), but dependent on the distance from the optical axis (axis of rotation). The lenses illustrated in FIGS. 6 and 7 correspond to the lenses depicted in FIGS. 3 or 4, regarding the curvature courses of both surfaces and the value of the refractive index of the axis of rotation (r=0).

Figure 7A:
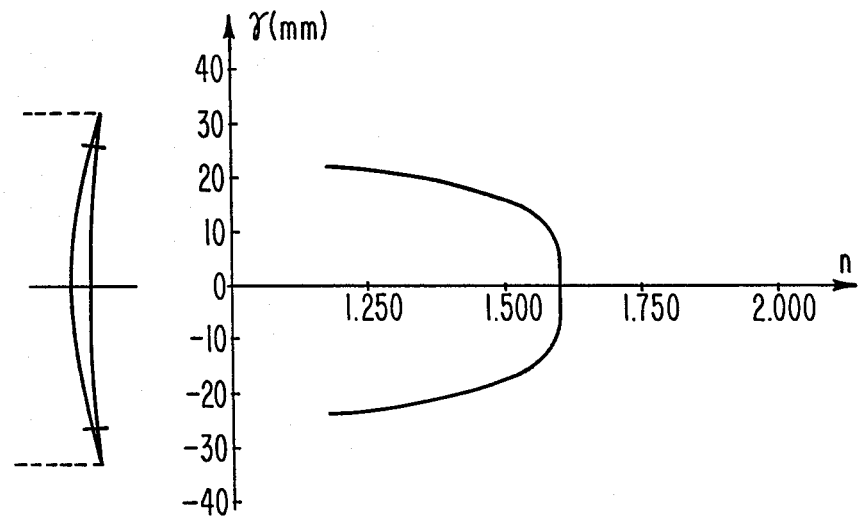
Figure 7B:
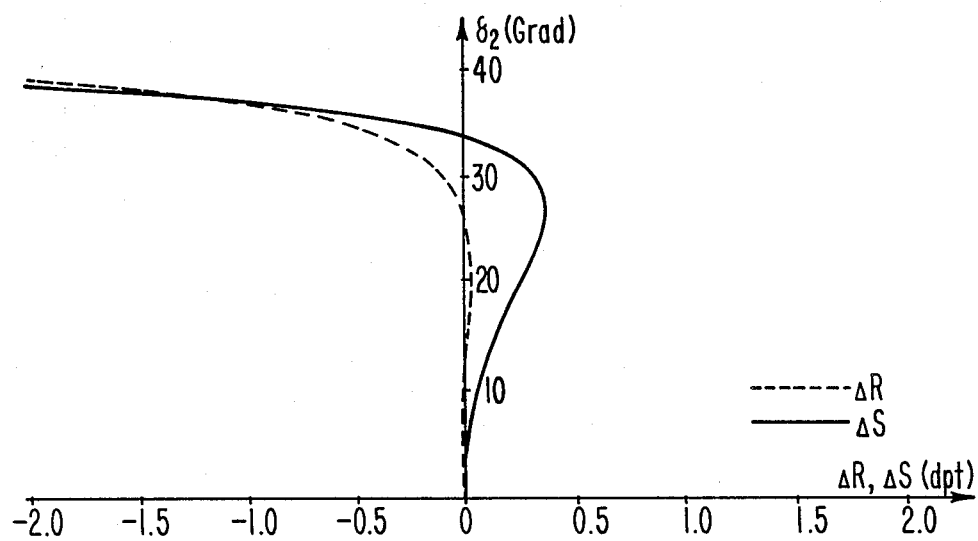

As the refractive index n(r) plotted in FIGS. 6 and 7(a) as a function of distance r shows, the refractive index is almost constant in the center zone, having a diameter of approx. 10-15 mm, and decreases beyond this zone. The refractive index of the lens illustrated in FIG. 5 also varies within this zone, however, the change is smaller as a function of the distance than beyond the center zone.

By this means, it is accomplished—as can be seen in FIGS. 5 to 7(b)—that aberrations $\Delta R$ and $\Delta S$ have become substantially smaller as a function of the visual angle.

In particular, it is even possible to specify a strict, specific course for the aberrations. In the illustrated embodiments, it was specified to maintain the refraction error $\Delta R$ at a value of approx. 0 unitl a visual angle of approx. 30°.

Of course, other specifications are possible, as by way of illustration a certain ratio of refraction error $\Delta R$ and astigmatism $\Delta S$ as well as certain specification for the plus and minus signs of both aberrations.

The calculation of the refractive index n as a function of distance r expediently yields so-called spline functions. FIGS. 8 to 11 show uniform strength negative ophthalmic lenses.

Figure 8A:
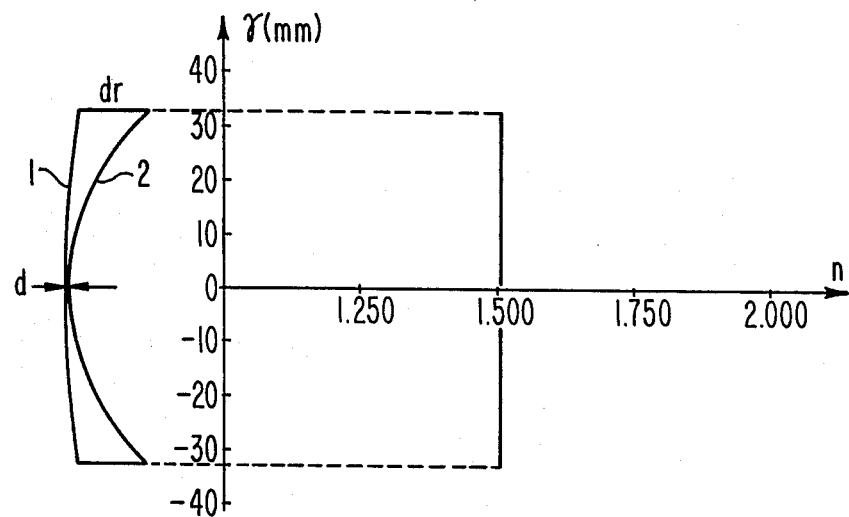
FIGS. 8A to 11B show the course of the refractive index functions and of the aberrations for negative uniform strength ophthalmic lenses, having spheric or aspheric surfaces and different peripheral thicknesses.
Figure 8B:
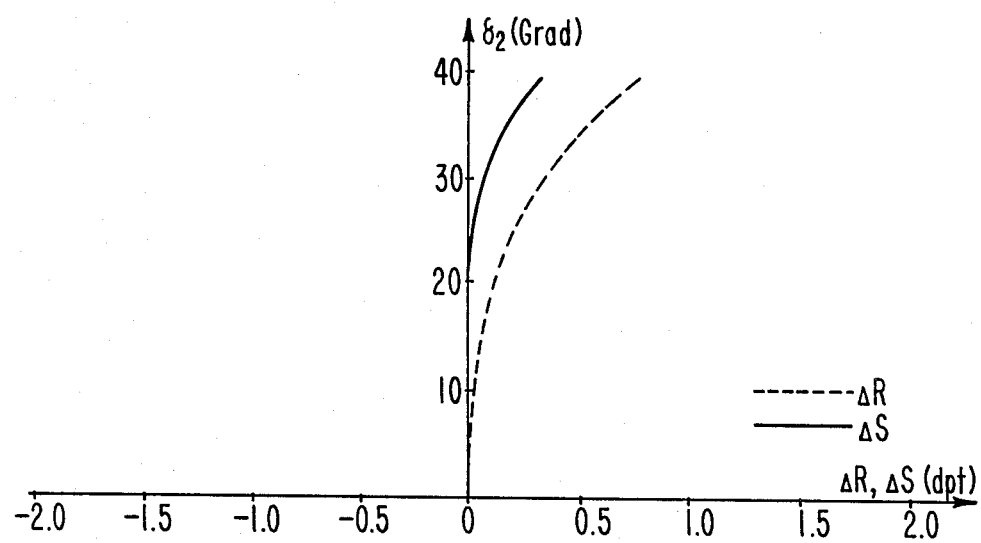

Whereas FIGS. 8(a) depicts a "common" uniform strength ophthalmic lens, having spheric surfaces 1 and 2 and a homogeneous refractive index n, whose peripheral thickness dr of 13.75 mm is relatively large. The aberrations are, however, as FIG. 8(b) shows, relatively small.

Figure 9A:
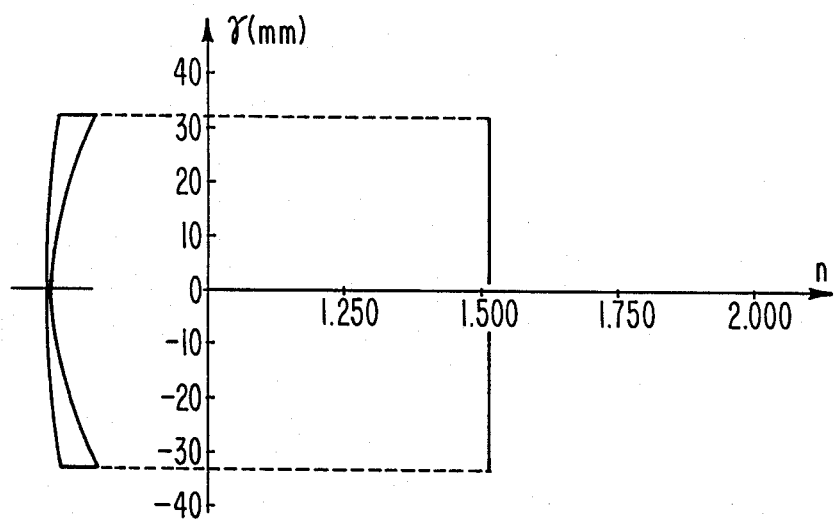
Figure 9B:
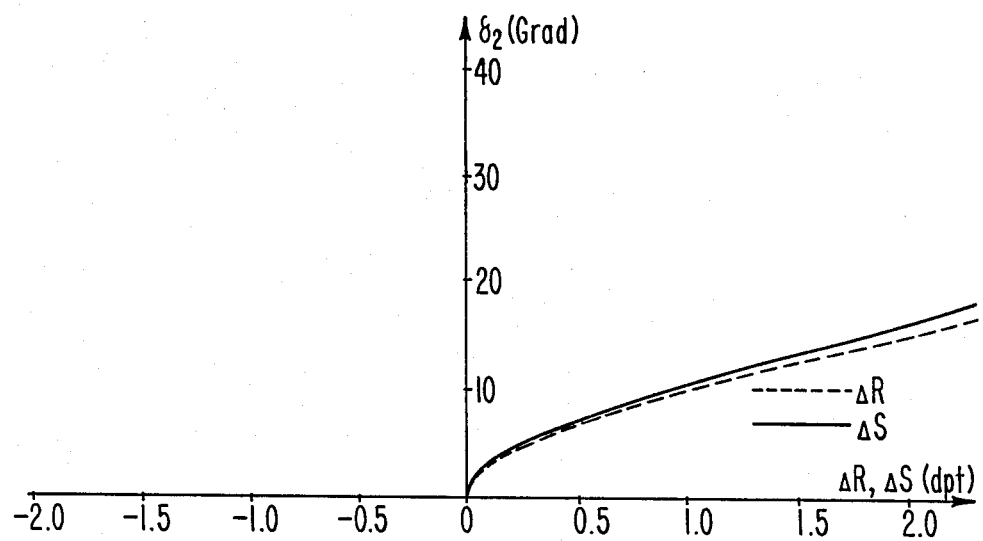

FIG. 9 depicts a uniform strength negative ophthalmic lens, having an aspheric rear surface and a homogeneous refractive index, thereby considerably reducing the peripheral thickness to 7.13 mm, but increasing the aberrations as a function of the visual angle to such an extent that the lens would not be acceptable in practice.

Figure 10A:
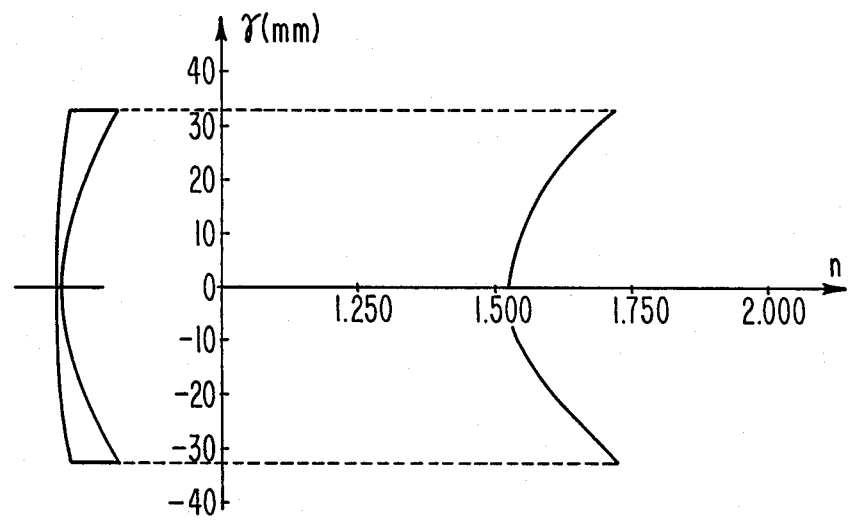
Figure 10B:
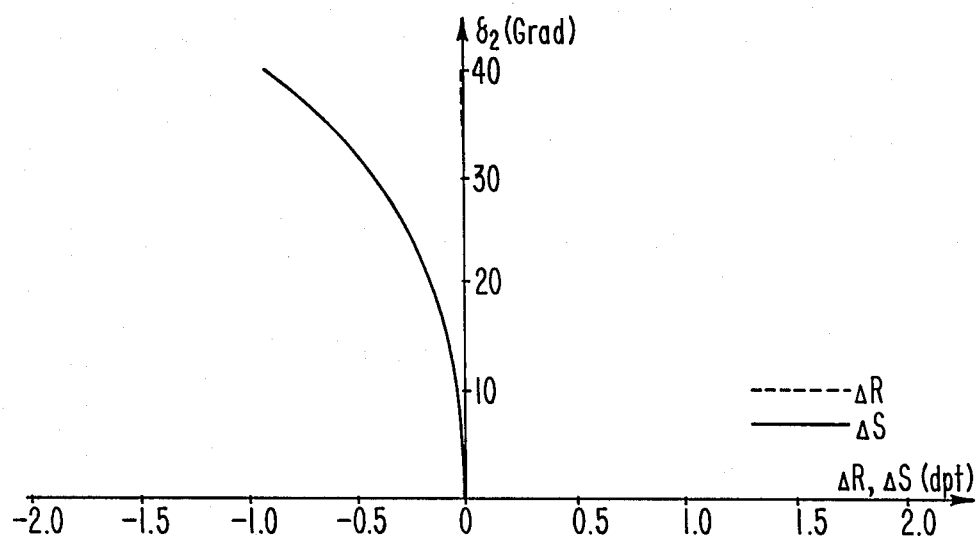
Figure 11A:
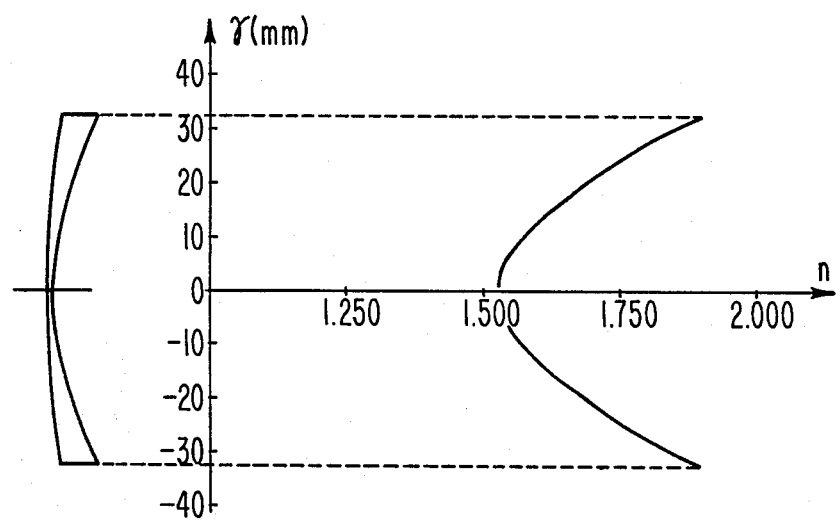
Figure 11B:
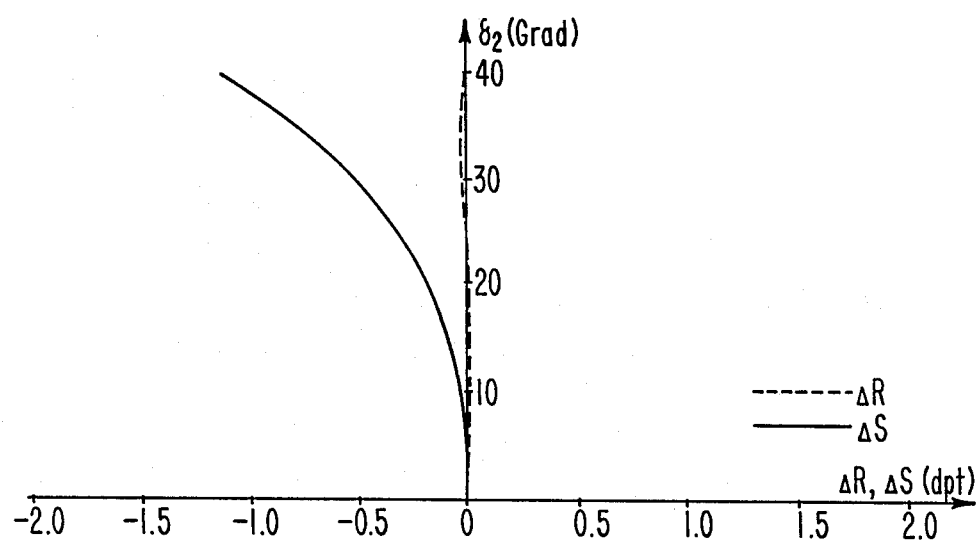

FIGS. 10 and 11 depict the uniform strength lenses according to the present invention, having the same effect as the ones illustrated in FIGS. 8 and 9 and a gradient refractive index, varying as a function of distance r from the optical axis, whereby different peripheral thicknesses were specificed, yet it is nonetheless possible to maintain the refraction error at 0 up to a visual angle of approx. 40° while at the same time having low astigmatism. values.

The opthalmic lenses by the method of the present invention illustrated in FIG. 11 has the same aspheric surface as the lens depicted in FIG. 9.

The foregoing preferred embodiments demonstrate that it is possible to make negative and positive ophthalmic lenses by the method of the invented concept whose critical thicknesses—peripheral thickness or center thickness—are substantially reduced compared to ophthalmic lenses having spheric surfaces. At the same time image quality is raised substantially compared to opthalimic lenses having aspheric lenses and a homogeneous refractive index. This is particularly the case with minus lenses, in which even with complicated aspheric surfaces no great reduction of the peripheral thickness can be attained while at the same time having good image-forming properties. Especially surprising, however, is that it is possible to specify certain aberrations or the ratio between certain aberrations.

In the illustrated preferred embodiments a refraction error of 0 was specified for a certain visual angle zone.

It can just as easily be specified that the refraction error should assume positive values and astigmatism negative values and that the ratio of these two aberrations should have specific average value at certain visual angle or over a certain visual angle zone. By means of such a specification the absolute value of an individual aberration, can, by way of illustration, be reduced.

| FIG. | D/dpt | $D_1$/dpt | $D_2$/dpt | d/mm | dr/mm | K | $n_o$ |
|---|---|---|---|---|---|---|---|
| 1 | 8.00 | 9.46 | −2.00 | 8.79 | 0 | 0 | 1.525 |
| 2 | 8.00 | 9.55 | −2.00 | 7.54 | 0 | 0 | 1.6 |
| 3 | 8.00 | 9.63 | −2.00 | 5.87 | 0 | −4.5 | 1.525 |
| 4 | 8.00 | 9.77 | −2.00 | 3.79 | 0 | −13.7 | 1.6 |
| 5 | 8.00 | 9.25 | −2.00 | 5.87 | 0 | 0 | 1.525 |
| 6 | 8.00 | 9.63 | −2.00 | 5.87 | 0 | −4.5 | 1.525 |
| 7 | 8.00 | 9.77 | −2.00 | 3.79 | 0 | −13.7 | 1.6 |
| 8 | −10.00 | 2.00 | −12.00 | 0.8 | 13.75 | 0 | 1.525 |
| 9 | −10.00 | 2.00 | −12.00 | 0.8 | 6.86 | −6.67 | 1.525 |
| 10 | −10.00 | 2.00 | −11.65 | 0.8 | 8.86 | −2.7 | 1.525 |
| 11 | −10.00 | 2.00 | −11.28 | 0.8 | 6.86 | −6.0 | 1.525 |

In the preferred embodiments illustrated in FIGS. 1-7, the front surface is aspheric and in those depicted in FIGS. 8-11 it is the rear surface.

The surfaces of embodiments with K=0 are exclusively spheric.

What is claimed is:

1. A uniform strength ophthalmic lens having a gradient refractive index changing rotation-symmetrically about the optical axis,
   wherein the course of curvature of at least one of the two surfaces of the optical lenses is selected without consideration of the correction of aberration so that the critical thickness of the opthalmic lenses does not exceed a specific value, and
   that the correction of the aberration is effected due to the change in the refractive index rotation-symmetrically about the optical axis of the lens.

2. An ophthalmic lens as described in claim 1, wherein the refractive index changes as a function of the distance from the optical axis.

3. An ophthalmic lens as described in claim 1, wherein the refractive index changes vertically to at least one of the two surfaces.

4. An ophthalmic lens as described in claim 1, wherein the opical axis runs through the geometrical center of a round glass blank.

5. An ophthalmic lens as described in claim 1, wherein a center thickness (d) of a positive ophthalmic lens is reduced to a specified value.

6. An ophthalmic lens are described in claim 5, wherein both surfaces of a positive ophthalmic lens are spherical.

7. An ophthalmic lens are described in claim 5, wherein at least one surface of a positive ophthalmic lens is aspheric.

8. An ophthalmic lens as described in claim 7, wherein the aspheric surface is the front surface.

9. An ophthalic lens as described in claim 1, wherein the peripheral thickness (dr) of a negative ophthalmic lens is reduced to a specified value.

10. An ophthalmic lens as described in claim 9, wherein at least one of the surfaces of a negative ophthalmic lens is aspheric.

11. An ophthalmic lens as described in claim 10, wherein the aspheric surface is the rear surface.

12. An ophthalmic lens as described in claim 1, wherein the refractive index only changes in the zone between the optical axis and the center visual angle and is about constant outside this zone.

13. An ophthalmic lens as described in claim 1, wherein the refractive index decreases from the optical axis outward in a positive ophthalmic lens and increases in a negative ophthalmic lens.

14. An ophthalmic lens as described in claim 1, wherein at least one surface of the lens is a flat rotational hyperboloid aspheric surface.

15. An ophthalic lens as described in claim 1, wherein the change in refractive index corrects aberration of astigmatism and refraction error.

16. A method of making a uniform strength ophthalmic lens having a gradient refractive index changing rotation-symmetrically about the optical axis comprising the steps of selecting the course of curvature of at least one of the two surfaces of the ophthalmic lens so that the critical thickness of the ophthalmic lens does not exceed a predetermined value and without consideration of correction of aberration, and correcting the aberration by changing the refractive index rotation-symmetrically about the optical axis.

17. A method as described in claim 16, wherein the step of correcting aberration error by changing the refractive index includes correction for astigmatism and refraction error.

* * * * *